(12) United States Patent  
Kontny et al.

(10) Patent No.: US 7,543,237 B2
(45) Date of Patent: Jun. 2, 2009

(54) DYNAMIC COLLABORATION ASSISTANT

(75) Inventors: Nathan D. Kontny, Chicago, IL (US); J. C. Groon, Chicago, IL (US); Katie J. Arnholt, Chicago, IL (US); Charles Nebolsky, Northbrook, IL (US); Mark Jacobson, Chicago, IL (US)

(73) Assignee: Accenture Global Servicecs GmbH, Schaffhausen (CH)

( * ) Notice: Subject to any disclaimer, the term of this patent is extended or adjusted under 35 U.S.C. 154(b) by 684 days.

(21) Appl. No.: 10/391,680

(22) Filed: Mar. 19, 2003

(65) Prior Publication Data

US 2004/0183829 A1 Sep. 23, 2004

(51) Int. Cl.  
*G06F 3/00* (2006.01)

(52) U.S. Cl. .................. 715/759; 715/751; 715/733

(58) Field of Classification Search .................. 715/751, 715/759, 733, 754
See application file for complete search history.

(56) References Cited

U.S. PATENT DOCUMENTS

| | | | | |
|---|---|---|---|---|
| 6,061,717 | A * | 5/2000 | Carleton et al. | 709/205 |
| 6,292,825 | B1 | 9/2001 | Chang et al. | 709/206 |
| 6,349,327 | B1 * | 2/2002 | Tang et al. | 709/205 |
| 6,425,016 | B1 * | 7/2002 | Banavar et al. | 719/310 |
| 6,675,197 | B1 | 1/2004 | Satoh et al. | 709/204 |
| 7,103,846 | B1 * | 9/2006 | Shafrir et al. | 715/751 |
| 7,149,959 | B1 * | 12/2006 | Jones et al. | 715/500.1 |
| 2004/0093328 | A1 * | 5/2004 | Damle | 707/3 |
| 2004/0179036 | A1 * | 9/2004 | Teplov et al. | 345/751 |
| 2006/0117264 | A1 * | 6/2006 | Beaton et al. | 715/751 |

FOREIGN PATENT DOCUMENTS

| | | |
|---|---|---|
| EP | 0 784 263 A1 | 7/1997 |
| EP | 0954146 A2 | 11/1999 |
| JP | 2000-250864 A | 9/2000 |
| WO | WO 00/77661 A2 | 12/2000 |

OTHER PUBLICATIONS

Rhodes, B.J., Starner, T., "Remembrance Agent: A continuously running automated information retrieval system," The Proceedings of The First International Conference on the Practical Application of Intelligent Agents and MultiAgent Technology, (PAAM '96), XP-2139090A1.

Office Action dated Sep. 30, 2008, issued in European Patent Application No. 04250122.1, 8 pgs.

* cited by examiner

*Primary Examiner*—Dennis Bonshock
(74) *Attorney, Agent, or Firm*—Brinks Hofer Gilson & Lione (57) ABSTRACT

A dynamic collaboration assistant application for use in a computing system including a terminal connected to a server. The dynamic collaboration assistant application includes a collaborative gateway application for generating a collaborative gateway GUI on the terminal. A context listener module located on the terminal is used to continuously monitor a context in which a user is using the terminal. A context translator module analyzes the context message and dynamically adjusts the display of the plurality of collaboration applications in the collaborative gateway GUI as a function of the context in which the user is using the terminal.

39 Claims, 7 Drawing Sheets

DYNAMIC COLLABORATION ASSISTANT

FIELD OF THE INVENTION

The present invention relates generally to collaboration and, more particularly, to a dynamic collaboration assistant application that provides a collaborative gateway to information resources and applications.

BACKGROUND OF THE INVENTION

Collaboration may generally be defined as the strategic and tactical sharing of information between partners for the purpose of developing a joint plan of action, and then working together to execute that plan of action. Businesses that employ basic methods of collaboration can reduce costs and increase worker efficiency. In terms of computing applications, there is a wide range of collaboration capabilities that offer different types of interaction options at varying levels of fidelity. Some of the well-known collaboration applications may include an email application, a groupware application, a messaging service application, a meeting support application and a team workspace application.

Electronic mail applications give users the ability to communicate by sending information or files back and forth electronically. Groupware applications provide databases that allow workers to store knowledge and information, making it available for sharing and future use. Messaging service applications enable users to communicate synchronously, one to one or many to many, without using the telephone or video conferencing applications. Team workspace applications provide virtual rooms that give users the ability, both synchronously and asynchronously, to share and store information.

Pressures on product development and providing solutions to problems mandate that people work smarter, faster, and better. The current collaboration capabilities only provide a patchwork solution to address point problems and therefore are viewed as only capable of providing a limited amount of value. Handoffs between processes also create bottlenecks and inefficiencies. Solutions to problems that require collaboration with parties that normally appear earlier in standard processes are not addressed by the implemented tools. In addition, people in organizations are filling multiple and distinct roles within the organization, which leads to cognitive dissonance and lost productivity as users attempt to "switch context".

As such, a need exists for a dynamic collaborative assistant application that integrates collaborative services into business processes to enable partners to share related information

SUMMARY OF THE INVENTION

An embodiment of the present invention discloses a method of collaborating in a computing system that includes terminals connected to a server with a dynamic collaboration assistant application. The method includes the step of generating a collaborative gateway GUI on the terminal that includes a display of at least one collaboration option or application. The context in which a user is using the terminal may be monitored by the dynamic collaboration assistant application or explicitly set by the user. The display of the collaboration option in the collaborative gateway GUI may be adjusted as a function of the context in which the user is using the terminal or explicitly set by the user.

A context listener module located on the terminal may be used to monitor the context in which a user is using the terminal. The context listener module includes a background text-scanning component that scans a document opened on the terminal to determine if the document is a new document. The background text-scanning component initiates a context parser component if the background text-scanning component discovers that the document that has been opened by the terminal is a new document.

The context parser component includes a context parser algorithm that is used to determine if the document contains relevant contextual information. The context parser algorithm determines the relevant context of the document by comparing a user profile with the contents of the document. The comparison made by the context parser algorithm is based in part on a contextual matching pattern. The context parser transmits a message to a context translator module located on the server if the document contains a relevant context. The message may include a user identity and a detected context indication. If the document or chat session has already been registered in the database, the dynamic collaboration assistant application will already know the context that particular document or chat session implies.

The context translator module may include a context message-handling component for reading the message to determine the user identity and detected context indication. A context lookup component of the context translator module queries the detected context indication against a knowledge model to determine a list of relations as a function of the detected context indication. The list of relations may include an associated user list and a documents list. A new context notification component of the context translator module generates a new context message that is transmitted to the terminal. The new context message is then used by the terminal to adjust the display of the collaboration options in the collaborative gateway GUI to the newly detected context.

The present invention also discloses a dynamic collaboration assistant application for use in a computing system that includes a terminal that is connected with a server. The dynamic collaboration assistant application includes a collaborative gateway module that generates a collaborative gateway GUI on the terminal. The collaborative gateway GUI may include a display of a plurality of collaboration applications. A context listener module on the terminal continuously monitors a context in which a user is using the terminal. The context listener module generates a context message as a function of the context in which the user is using the terminal. A context translator module analyzes the context message and dynamically adjusts the display of the collaboration applications in the collaborative gateway GUI as a function of the context in which the user is using the terminal.

The context listener module may include a background text-scanning component that is operable to scan a document opened on the terminal to determine if the document is a new document. The context listening module may include a context parser component that determines if the document contains a relevant context. A context parser algorithm may be used by the context parser component to determine if the document contains a relevant context. The relevant context may be determined in part by the context parser algorithm by comparing a user profile with the new document. The comparison may be based on a contextual matching pattern.

The context listener module may be placed in an active or inactive state by the user of the terminal. A selection option in the collaborative gateway GUI may allow the user to activate or deactivate the context listener module. When the context listener module is inactive, the user's context is static. In addition, the user may also be provided with a context selection option in the collaborative gateway GUI that allows the user to manually set the context of the collaborative gateway GUI to a given context. If the user manually sets the context of the collaborative gateway GUI to a specific context, the context listener module will remain inactive.

The context parser may transmit a message to a context translator module located on the server if the document contains a relevant context and is a new document or chat session. The message may include a user identity and a detected context indication. The context translator module may include a context message-handling component for reading the message to determine the user identity and the detected context indication. A context lookup component of the context translator module is used to query the detected context indication against a knowledge model to determine a list of relations as a function of the detected context indication. The list of relations may include enterprise wide information including a context-specific buddy list, a context-specific calendar, a context-specific to-do list, a context-specific email listing, a context-specific file list and so forth.

A new context notification component of the context translator module may generate a new context message that may be transmitted to the terminal. The new context message is used to adjust the display of the collaboration applications in the collaborative gateway GUI. As such, the present invention provides a method and system for collaborating in a business setting that allows a user to be informed of individuals, documents, news, tasks, and various other informational items that relate to a particular context or subject area.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
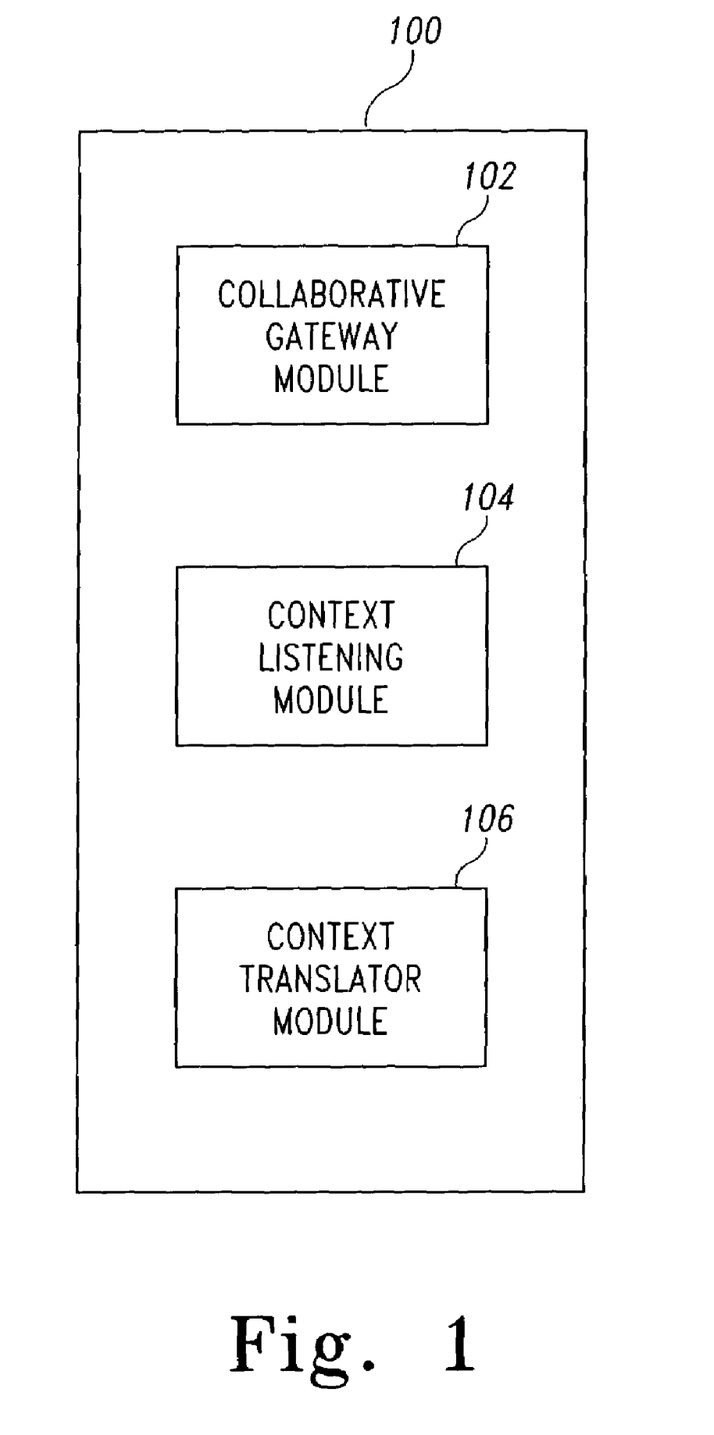
FIG. 1 is a block diagram of the dynamic collaboration assistant application.

Referring to FIG. 1, the present invention discloses a dynamic collaboration assistant application 100. The dynamic collaboration assistant application 100 may include a collaborative gateway module 102, a context listener module 104 and a context translator module 106. The collaborative gateway module 102 may provide a single point of reference to a user's collaborative applications. The context listener module 104 is responsible for reporting a context of a user's computing. The context translator module 106 translates context notifications received from the context listener module 104 into actions that adjust the context of the collaboration applications. The context listener module 104 and the context translator module 106 may be implemented as VB.NET applications.

Figure 2:
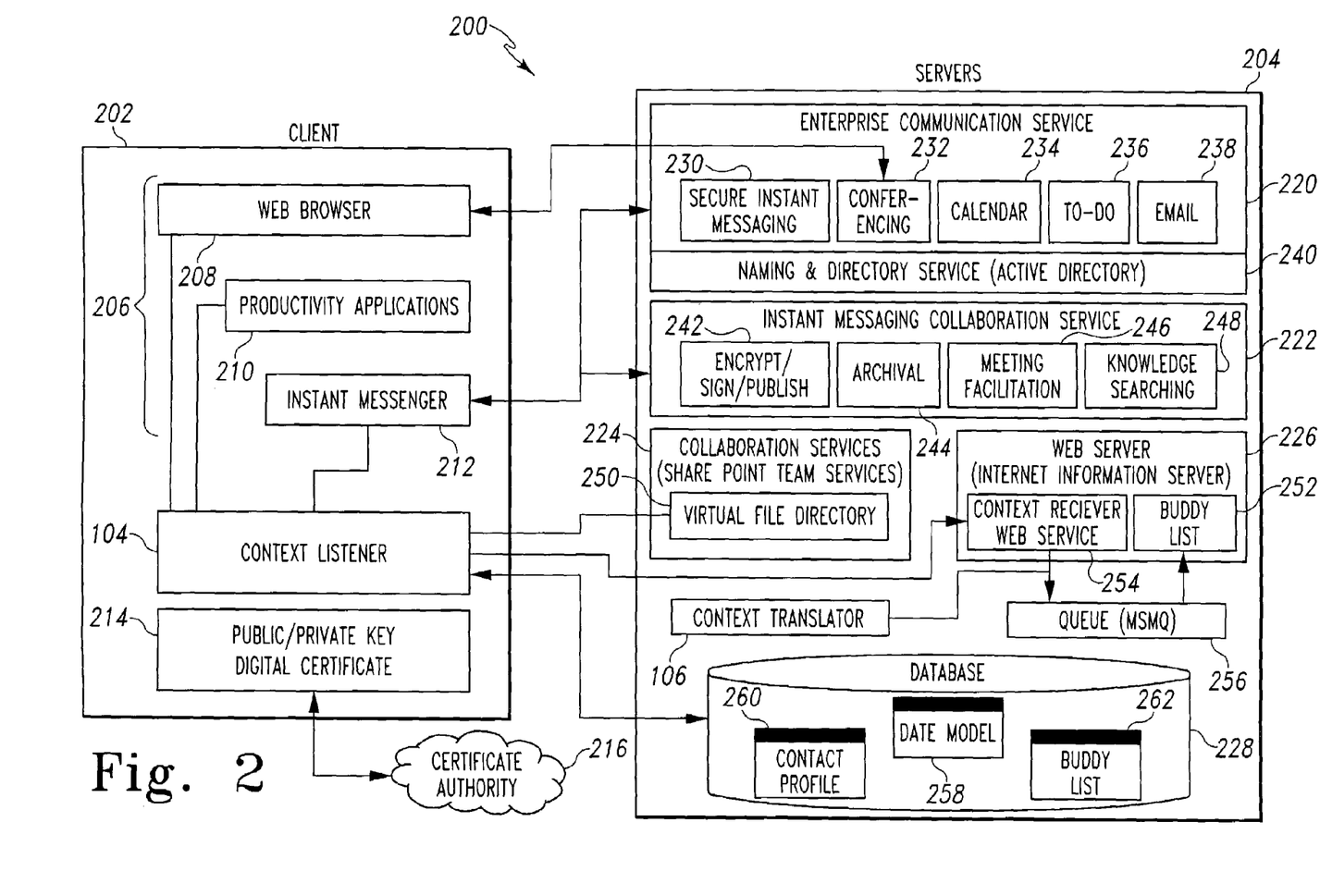
FIG. 2 illustrates a network computing system with a terminal connected to a server.

Referring to FIG. 2, the dynamic collaboration assistant application 100 may be employed in a network computing system or environment 200. The network computing system 200 may include a client terminal 202 that is connected to a server 204. The terminal 202 may include the context listener module 104 and a plurality of collaboration applications or options 206. The collaboration applications 206 may include a web browser 208, a plurality of productivity applications 210 and a messenger service application 212. Collaboration applications may also be located on, and provided by, the servers 204. The terminal 202 may also include a security module 214 that may obtain or include a public/private key and a digital certificate. The digital certificate may be obtained from another source or server 216 that is connected with the terminal 202 through any type of network connection.

The collaboration applications 206 may include a web browser application 208 that allows a user of the terminal 202 to obtain access to a plurality of files, documents or services that are located on remote servers (not illustrated). The web browser application 208 may be selected from one of several existing web browsers available on the market including Microsoft's Internet Explorer and Netscape's Netscape Navigator. Those skilled in the art should recognize that any web browser application 208 may be used and taken advantage of by the present invention.

The productivity applications 210 may include a broad range of existing applications that allow a user to be productive in a business environment. As an example, the productivity applications 210 may include a word processing application, a spreadsheet application, a presentation application, a publication application and so forth. In one embodiment of the present invention, the productivity applications 210 may be provided by using Microsoft's Office XP. Those skilled in the art should recognize that several types of productivity applications 210 may be used in the present invention.

The messenger service application 212 enables users to communicate synchronously, one to one or many to many, without using the telephone or video conferencing. Again, those skilled in the art should recognize that various different types of messenger service applications 212 could be used and taken advantage of by the present invention. The messenger service application 212 may be an internally developed messenger service application or a messenger service application provided by a third-party, such as MSN Messenger, Yahoo Instant Messenger and AOL Instant Messenger. Although not specifically illustrated, the collaboration applications 206 located on the terminal 202 may also include a file or document management application, a groupware application, and a team workspace application.

As illustrated in FIG. 2, the server 204 may include an enterprise communication service application 220, an instant messaging collaboration service application 222, a collaboration service application 224, a web server application 226, the context translator module 106, and a database 228. The communication service application 220 may include a secure instant messaging component 230, a conferencing component 232, a calendar component 234, a task management or to-do component 236, an email component 238 and a directory services component 240. All of the above-referenced applications and components are collaboration applications that may be provided by the server 204 to the client 202.

The secure instant messaging component 230 provides secure instant messaging to all of the terminals 202 connected with the server that allow the terminals 202 to send and receive instant messages to other individuals in the business enterprise or outside the business enterprise. The conferencing component 232 is a collaboration tool that allows the terminals 202 to conduct conferences with other terminals 202. The calendar component 234 provides a calendar to the terminals 202 that allows them to view dates and enter items on particular dates. The task management component 236 provides a user with the ability to enter items that need to be accomplished on particular days.

The email component 238 provides an email account to users of the terminals 202 that allow the users to send and receive electronic mail. The naming and directory service component 240 allows users to look-up information about individuals within the business enterprise. The naming and directory service component 240 may also query a human-resource system or database as well to look-up information about individuals. The enterprise communication service application 220 may be provided by several existing software applications, such as Microsoft's Exchange Server 2000. Those skilled in the art should recognize the purpose and function of each component contained within the enterprise communication service application 220 and as such, an in depth discussion of each component has not been undertaken for the sake of brevity.

The instant messaging collaboration service application 222 may include a security component 242, an archival component 244, a meeting facilitation component 246 and a knowledge-searching component 248. The security component 242 is used to ensure that instant messaging sessions between terminals 202 are secure. In the preferred embodiment, the instant messaging application 212 on the terminal 202 may generate a user command to sign the instant message chat and a web page to which the users must navigate. Once at the page, the user clicks a sign button, which uploads the user's digital key to digitally sign the chat transcript. Any signed chat transcripts may be verified by reloading the signature and the chat transcript (both of which may be retrieved from the database 228).

The archival component 244 may be used to store chat transcripts in the database 228. This allows users to retrieve chat transcripts to review what was discussed during a particular chat session. The meeting facilitation component 246 may provide a user of the terminal 202 with information about another user such as where the user is located, the best way to contact the user, the status of the user (e.g.—on the phone, away from desk), and the availability of the user. The knowledge searching component 248 allows the user to search through archived chat transcripts.

The collaboration services application 224 provides a virtual file directory to users of the terminal 202. This application may include a virtual file directory component 250 that allows users to share files of various types. As set forth in detail below, the virtual file directory component 250 is operable to display files that relate to the context in which a user is using the terminal 202. The collaboration services application 224 may be an ASP.NET application that is operable to scan the database 228 or knowledge repositories (not illustrated) and generate a document list for the user based on the current active context of the terminal 202. A knowledge repository as used herein may refer to an electronic repository of information or data.

The web server application 226 may include a buddy list component 252 and a context receiver web service component 254. As set forth in greater detail below, the buddy list component 252 scans the database 228 and generates a buddy list for the user (the calling terminal 202) based on the current active context. The buddy list component 252 may be an ASP.NET application. The context receiver web service component 254 is a receive-only web service that accepts incoming context messages from the terminal 202 and passes them on to a context messages queue 256. The context receiver web service component 254 may be a VB.NET application and the context message queue 256 may be implemented using Microsoft Message Queue Server (MSMQ), a NET framework or any other suitable message queing specification.

The database 228 may include a data model component 258, a context profile component 260 and a buddy list component 262. The data model component 258 is used to compare a context in which the terminal 202 is being used to a knowledge model. The knowledge model contains links to associated individuals, files, documents, companies, governmental agencies and grants and other associations that relate to a given context. The context profile component 260 contains information about a given context such as users associated with the context, documents and files associated with the context and so forth. The buddy list component 262 contains a list of contacts associated with any given topic or context.

As set forth above, the dynamic collaboration application 100 may include a data model component 258. Information may be contained in a plurality of internal sources and external sources, such as internal and external data servers. An internal source of information is typically an information source that is under the control of the entity that employs the user and whose information may be proprietary to the entity. Internal sources of information may include, for example: discovery information, PD information, clinical information, regulatory information, and M&S information. An external source of information is typically an information source that is not under the control of the entity that employs the user. An external source may typically be accessible utilizing a wide area network such as the Internet and World Wide Web. External sources may include for example: bio-analysis information, study management information, safety data information, market report information, and Internet websites including government, public and subscription-based websites.

Although not illustrated, the data model component 258 may include an index creator component that may be connected to the internal and external sources by a network. The index creator component may also include or have access to the knowledge model. Utilizing the knowledge model, the index creator component may extract a wide variety of information from the internal and external sources, cleanse the extracted information, restructure the extracted information and then reconcile the extracted information into a knowledge model-based index.

The data model component 258 may also include an index database coupled to the index creator for storing the knowledge model-based index created by the index creator. Users may then access the knowledge model-based index stored in the database from a browser/portal utilizing the network. As an option, the data model component 258 may also include a web server or other similar type of computer for interfacing the browser/portal with the database.

The index may be used as a user's primary gateway to a wide variety of information sources in accordance with an embodiment of the present invention. From this index and with the assistance of the decision support application, a user may have the ability to retrieve the original information source. Some illustrative information sources may include a genomics database, a pre-clinical database, a clinical database, a departmental reports database, a subscription-based information database, and/or market report database. Some of these information sources may comprise exclusively internal or external sources while other information sources may comprise a combination of internal and external sources.

Figure 3:
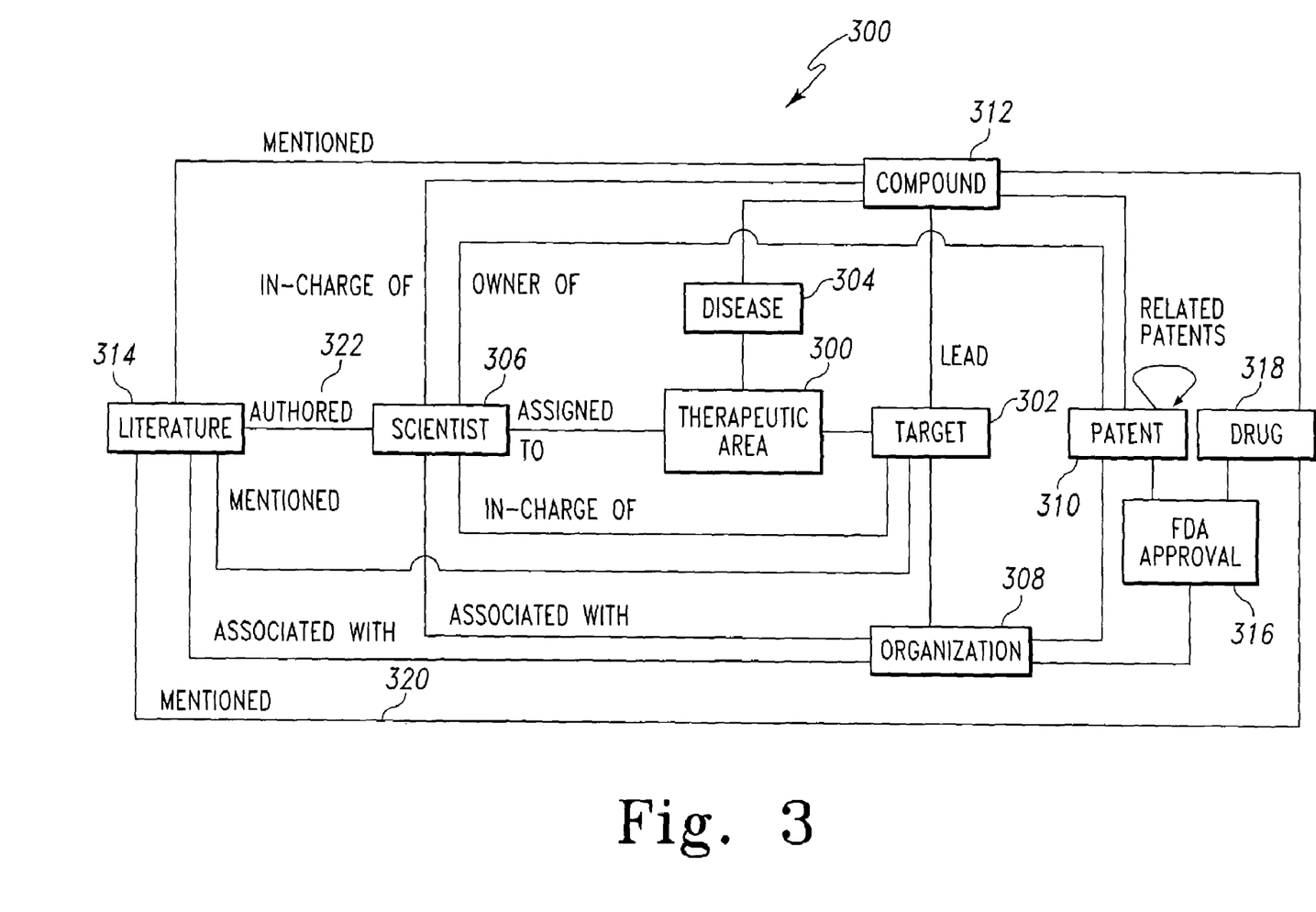
FIG. 3 is a schematic diagram of a knowledge model.

FIG. 3 is a schematic diagram of an illustrative knowledge model 300 in accordance with an embodiment of the present invention. The knowledge model 300 comprises a plurality of inter-related items. In an illustrative embodiment of the present invention, as illustrated in FIG. 3, the items of the knowledge model may include: a therapeutic area item 300, a target item 302, disease item 304, a scientist item 306, an organization item 308, a patent item 310, a compound item 312, a literature item 314, an FDA approval item 316, and a drug item 318. The knowledge model 300 illustrated in FIG. 3 relates to the pharmaceutical field, but it may be modified or adapted to any business field.

The inter-relations between the various items of the knowledge model 300 are illustrated in FIG. 3 by the plurality of connecting lines (e.g., connecting line 320) connecting each of the items to various other items. For example, the literature item 314 is directly related with the target item 302, the scientist item 306, the organization item 308, the compound item 312, and the drug item 318. Also shown in FIG. 3 are the manner or type of relationship 322 provided by the associated connecting line. For example, the relationship between the literature item and the scientist item is the term "Authored."

The knowledge model 300 also helps to provide an organization structure to the index generated by the data model component 258 so that the items of the generated index are arranged according to the organization structure. In one embodiment of the present invention, the organizational structure of the generated index may be based on the inter-relations between the items of the knowledge model 300.

The knowledge model 300 may be used by the dynamic collaboration application 100 to retrieve items that are associated with particular contexts. As such, the knowledge model 300 may be used to generate context-specific buddy lists, context-specific document lists, context-specific email lists, context-specific file lists, context-specific calendar listings, context-specific to-do lists and so forth. The dynamic collaboration application 100 uses the knowledge model 300 to determine the interrelations between particular topics or subject-matter areas. Based on these interrelations, the dynamic collaboration application 100 is capable of switching contexts to adjust to the current context in which the user is using the terminal 202.

Figure 4:
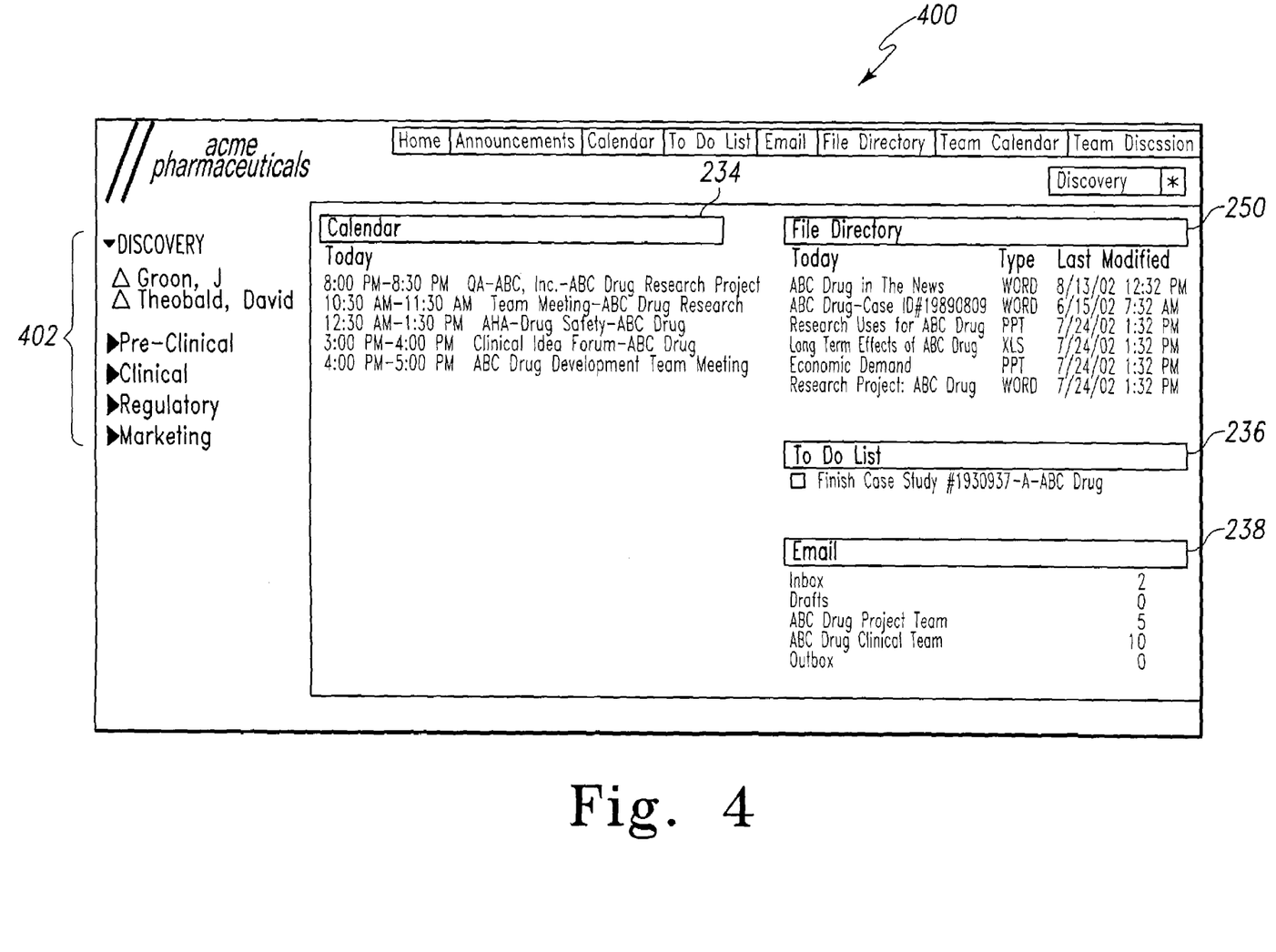
FIG. 4 is a representative illustration of a collaborative gateway GUI.

Referring to FIG. 4, the collaborative gateway module 102 of the dynamic collaboration application 100 may be operable to generate a collaborative gateway GUI 400 on the terminal 202. The collaborative gateway GUI 300 may include a display of a plurality of collaboration applications. As illustrated in FIG. 4, the collaborative gateway GUI 400 may include an instant message buddy list 402 that may be divided into a plurality of category areas. The collaborative gateway GUI 400 may also include a display of the calendar component 234, the virtual file directory component 250, the task management component 236 and the email component 238. Several different collaboration components may be displayed in the collaborative gateway GUI 400 and the above-referenced components are listed for illustrative purposes only.

As illustrated in FIG. 4, the current context of the collaborative gateway GUI 400 relates to the drug ABC. The drug ABC is used in FIG. 4 in an illustrative context in which the terminal 202 may be used and should not be construed as a limitation of the present invention. Each individual listed in the instant message buddy list 402 has some connection to the drug ABC. In addition, each item contained in the calendar displays, the file directory display, the task management display and the email display all relate in some manner to the drug ABC. As the context in which the terminal 202 is being used by a user changes, the dynamic collaboration assistant application 100 updates the collaborative gateway GUI 400 accordingly to reflect the proper context. The collaborative gateway GUI 400 preferentially includes a display of at least one collaboration application.

Figure 5:
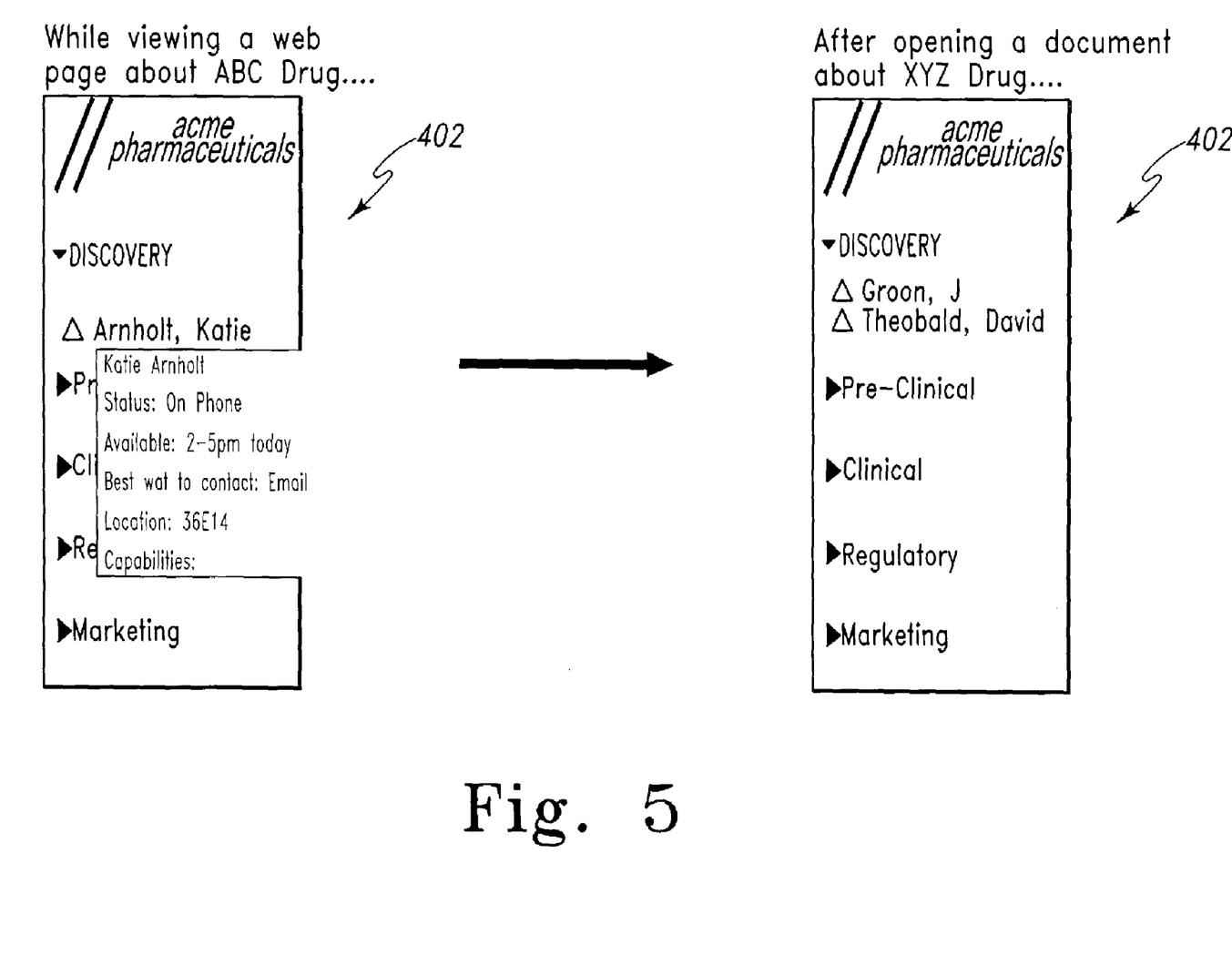
FIG. 5 depicts instant message buddy lists in two different contexts.

Referring to FIG. 5, two instant message buddy lists 402 of the collaborative gateway GUI 400 are set forth. The instant message buddy list 402 on the left side of FIG. 5 represents an instant message buddy list for a user when the user is using the terminal 202 in the context of the drug ABC. The instant message buddy list 402 on the right side of FIG. 5 represents an instant message buddy list for a user when the user is using the terminal 202 in the context of the drug XYZ. During operation, the dynamic collaboration assistant application 100 dynamically changes the display in the collaborative gateway GUI 400 to reflect the changes in the context in which a user is using the terminal 202.

The instant message buddy list 402 on the left also contains a representative illustration of the output of the meeting facilitation component 246 during operation on the terminal 202. When a user hovers over a respective contact in the instant message buddy list 402 using a selection device such as a mouse pointer, a contact GUI may be generated that contains contact information. This may incorporate current availability, preferred method of contact (also known as best route messaging) and the ability to instantaneously engage in a collaborative session. To engage in a collaborative session with the individual(s) listed in the buddy list 402, the user will use the selection device to start a collaborative session with the individual(s) listed.

As illustrated in FIG. 5, the instant message buddy list 402 for the drug ABC is different than the instant message buddy list for the drug XYZ. The dynamic collaboration assistant application 100 detects the changes in context and updates the display of the collaborative gateway GUI 400 according to the context in which the terminal 202 is being used. All of the collaboration applications that may be displayed in the collaborative gateway GUI 400 on the terminal 202 may be changed into the context in which the user is using the terminal 202. The instant message buddy lists 402 set forth in FIG. 5 are for illustrative purposes only and should not be construed as a limitation of the present invention.

Figure 6:
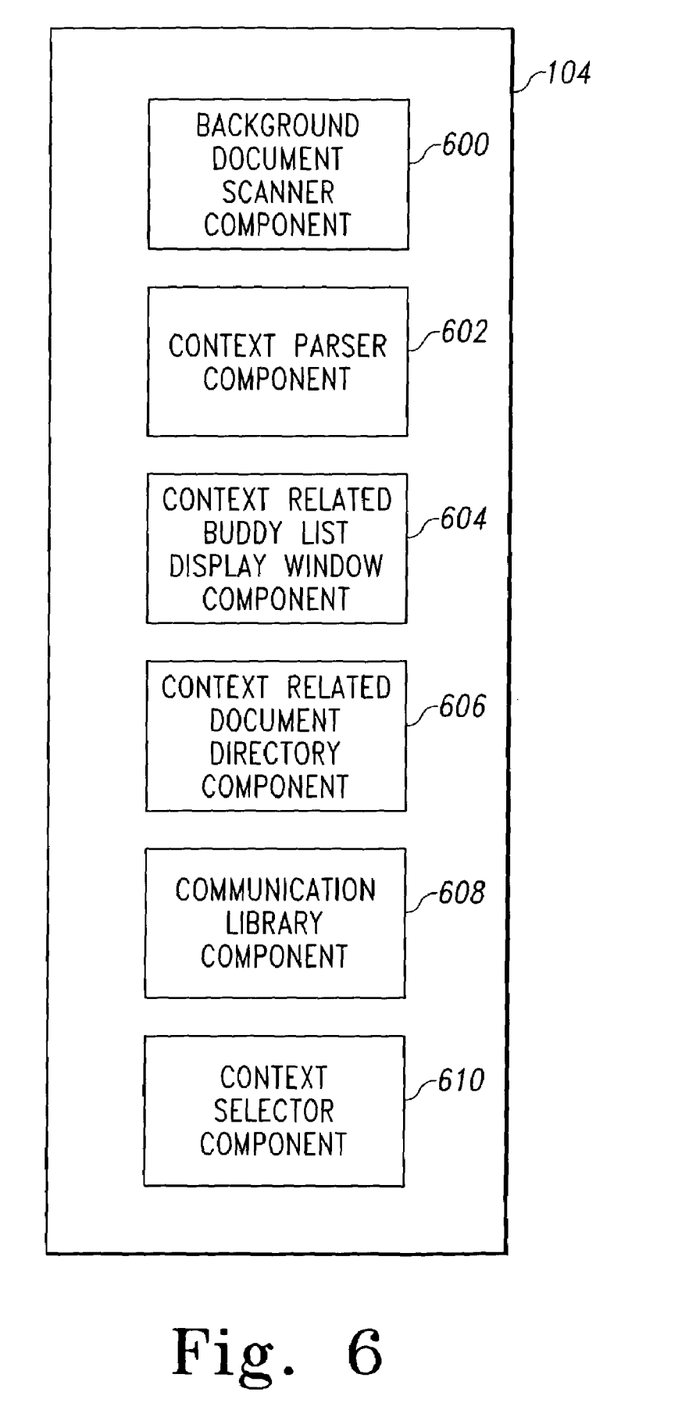
FIG. 6 illustrates the preferred components of the context listener module.

Referring to FIG. 6, the context listener module 104 of the dynamic collaboration assistant application 100 may include a background document scanner component 600, a context parser component 602, a context related buddy list display window component 604, a context related document directory component 606, a communication library component 608, and a context selector component 610. The context listener module 104 preferentially resides on the terminal 202 and is designed to monitor the context in which a user is using the terminal 202. As the context in which the terminal 202 is being used changes, the context listener module 104, if active, generates a message that is transmitted to the context translator module 106. In response to the message from the context listener module 104, the context translator module 106 generates a response that cause the collaborative gateway GUI 400 to change states depending upon the context in which the terminal 202 is being used by a user.

The background document scanner component 600 may automatically scan all open documents on the user desktop and when it detects a new document, it sends the new document to the context parser component 602 for analysis. The context parser component 602 reads the contents of the document and scans the document to detect if it contains a relevant context. A context parser algorithm is used to detect relevant contexts that are defined by a user in their respective context profile 260. The context parser algorithm may take as its input a user XML profile and the contents of an active document and determine a context as a result of contextual matching patterns.

The context related buddy list display window component 604 is used to adjust the instant message buddy list 402 of the collaborative gateway GUI 400 to list only individuals that are associated with a given context. The context related document directory component 606 takes advantage of an embedded web application to display a context-related document directory in the collaborative gateway GUI 400. The context related document directory component 606 may provide links to internal or external documents or files that relate to a given context.

The communication library component 608 is responsible for communicating with the context server 204, which may contain the context translator module 106, the context receiver web service module 254, the context related buddy list component 262, and the virtual file directory component 250.

The context listener module 104 also may include a context selector component 610. The context selector component 610 overrides an automatically detected context (by the context parser and background document scanner). In other words, the context selector component 610 allows a user of the terminal 202 to manually set the context in which the terminal 202 is being used by the user. As such, the context selector component 610 allows the user to manually set the context so that no matter what the user is doing on the terminal 202 the context will be set to a respective context that is selected by the user. A field may be generated in the collaborative gateway GUI 400 that allows the user to select the context.

Figure 7:
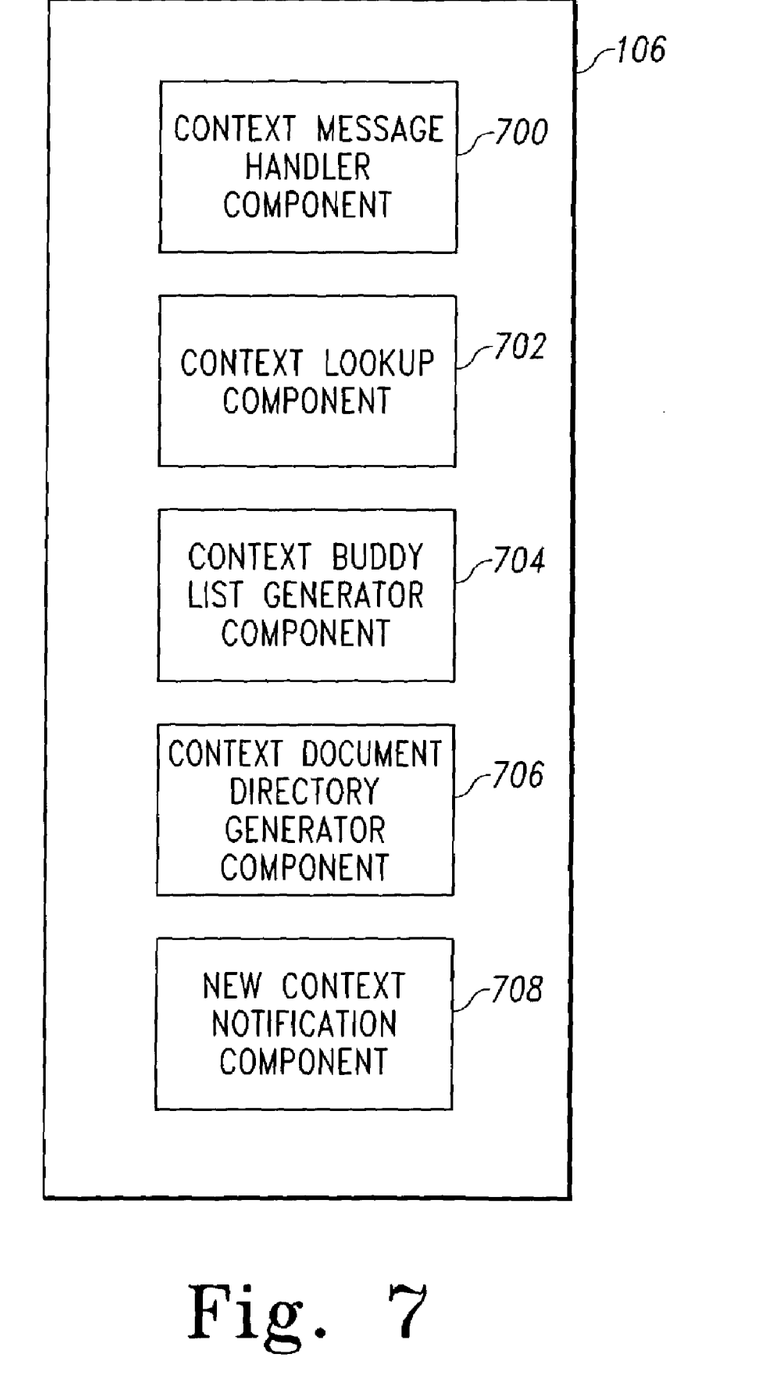
FIG. 7 illustrates the preferred components of the context translator module.

Referring to FIG. 7, the context translator module 106 may include a context message handler component 700, a context lookup component 702, a context buddy list generator component 704, a context document directory generator component 706, and a new context notification component 708. The context message handler component 700 monitors the context messages queue 256 and acts when a new message is received from a respective terminal 202. The context message handler component 700 acts when a new message is received from the context listener module 104. The context message handler component 700 determines the calling client or terminal 202 and the new detected context.

The context lookup component 702 may be used to query the new context against the data model 258 in the database 228 to find users and documents that are associated with the respective context. The context profile component 260 and the buddy list component 262 of the database 228 may also be queried to generate a document, file and buddy list associated with a particular context. When the list of users is generated, their availability and contact information is determined (also in the database 228) and the corresponding buddy list for the user (calling client or terminal 202) is updated and stored to the database 228 with the context buddy list generator component 704. Similar to the buddy list generator component 704, documents associated with the context are found and the pointers to their location are written to the database 228 by the context document directory generator component 706. The new context notification component 708 notifies the terminal 202 that the context has been processed so that the client buddy and document lists can be refreshed in the collaborative gateway GUI 400.

As non-limiting examples, the dynamic collaboration assistant application 100 that may be employed in a network computing system or environment 200 is a computer program product for use in collaborating across a computing network.

The computer program product may include a computer readable storage medium having computer readable code means embodied in the computer readable storage medium. The computer program product may include computer readable program code for generating a collaborative gateway graphical user interface (GUI) 400 on the terminal 202 that includes a display of at least one collaboration option.

The computer program product may include computer readable program code for continuously monitoring a context in which the terminal 202 is being used by a user of the terminal 202 and generating a context message as a function of the detected context.

The computer program product may further include computer readable program code for analyzing the context message and dynamically adjusting the display of the collaboration option in the collaborative gateway GUI 400 as a function of the context in which the user is using the terminal 202.

In some examples, the computer program product may include a context listener module 104 located on the terminal 202, which is used to monitor the context in which the terminal 202 is being used by a user. The context listener module 104 may include a background text-scanning component 600 that scans a document opened on the terminal 202 to determine if the document is a new document. The ground text-scanning component 600 initiates a context parser component 602 if the ground text scanning application 600 discovers the document is a new document, where the context parser component 602 includes a context parser algorithm that determines if the document contains a relevant context.

The relevant context may be determined by the context parser algorithm by comparing a user profile with the new document, where the comparison is based on a contextual matching pattern. The computer program product may include the context parser component 602 transmitting a message to a context translator module 106 located on the servers 204 if the document contains a relevant context, where the message includes a user identity and a detected context indication. The context translator module 106 may include a context message handling component 700 for determining the user identity and detected context indication.

In some examples, the computer program product may include a context lookup component 602 that queries the detected context indication against a knowledge model 300 to determine a list of relations as a function of the detected context indication, where the list of relations includes an associated user list and a document list.

The computer program product may also include a new context notification component of the context translator module 106 generates a new context message that is transmitted to the terminal 202, where the new context message is used to adjust the display of the collaboration option in the collaborative gateway GUI 400.

While the invention has been described in its currently best-known modes of operation and embodiments, other modes, embodiments and advantages of the present invention will be apparent to those skilled in the art and are contemplated herein.

What is claimed is:

1. A computer readable storage media for use in collaborating across a computing network, comprising:

computer readable program code embodied on the computer readable storage media, wherein the computer readable program code is executable on a terminal, the computer readable program code including:

the computer readable program code executable on the terminal to generate a collaborative gateway graphical user interface on the terminal that includes a display of at least one collaboration application, wherein the collaboration application includes at least one of a plurality of collaboration options;

the computer readable program code executable on the terminal to substantially continuously monitor a document in an application configured to display information to a user of the terminal;

the computer readable program code executable on the terminal to scan or parse a content of the document in the application to detect a change in a context in which the terminal is being used by the user of the terminal;

the computer readable program code executable on the terminal to receive from a server via the computing network, a context profile of the user, wherein the context profile is stored in a context profile database in association with the server and defines at least one relevant context associated with the collaboration gateway graphical user interface, and wherein the context profile is at least partially defined by the user;

the computer readable program code executable on the terminal to, when the change in the context is detected, compare the change detected in the context in which the terminal is being used by the user of the terminal to the received context profile of the user to determine a correlation, or a match, between the change detected in the context and the received context profile of the user;

the computer readable program code executable on the terminal to determine whether the change detected in the context includes the at least one relevant context based upon the correlation, or the match, of the change detected in the context and the received context profile of the user, wherein the at least one relevant context is defined by the user in the context profile of the user stored in the context profile database;

the computer readable program code executable on the terminal, responsive to determination that the change detected in context includes the at least one relevant context, to generate a context message;

the computer readable program code executable on the terminal to transmit the context message to the server, wherein the context message includes a user identifier and a context indication;

the computer readable program code executable on the terminal to receive a new context notification transmitted by a collaboration assistant application on the server in response to the context message; and the computer readable program code executable on the terminal to adjust the display of the collaboration options in the collaborative gateway graphical user interface based on the new context notification.

2. The computer readable storage media of claim 1, wherein the document is a newly opened document; and wherein the computer readable program code executable on the terminal to substantially continuously monitor the document in the application configured to display information to the user of the terminal further comprises:

the computer readable program code executable on the terminal to background text-scan the newly opened document at a time the newly opened document is opened on the terminal; and the computer readable program code executable on the terminal to determine whether a document context of the newly opened document was previously determined; and the computer readable program code executable on the terminal to analyze the newly opened document to determine the document context based upon determination that the document context was previously undetermined.

3. The computer readable storage media of claim 2, further comprising computer readable program code embodied on a server memory, wherein the computer readable program code is executable on a server processor of the server in communication with the server memory, the computer readable program code including:

the computer readable program code executable on the server to query the context indication against a knowledge model to determine a list of relations, based on the context indication received from the terminal.

4. The computer readable storage media of claim 3, wherein the list of relations includes an associated user list and a document list.

5. The computer readable storage media of claim 4, further comprising the computer readable program code executable on the server to generate a message including the new context notification for transmission to the terminal.

6. A method of collaborating across a computing network comprising: generating a collaborative gateway graphical user interface on a terminal that includes a display of at least one collaboration application, the at least one collaboration application including at least one of a plurality of collaboration options;

identifying, at the terminal, a subject matter related context in which the terminal is being used by a user of the terminal;

detecting a change in a focus to a newly active document at the terminal;

recognizing at the terminal that the newly active document is new, or unscanned, or unparsed;

detecting at the terminal whether a context of the newly active document is known in response to detection that the newly active document is new, or unscanned, or unparsed;

pattern matching, at the terminal, a content of the newly active document to detect a contextual pattern match for the content of the active document in response to detection that the newly active document is unknown;

in response to detection diction of the contextual pattern match at the terminal, determining, at the terminal, the context of the newly active document based upon the content of the newly active document and the detected contextual pattern match performed by the terminal at the terminal;

retrieving, by the terminal via the computer network, a user context profile from a database, wherein the user context profile includes user defined relevant context information, and wherein the user context profile is at least partially defined by the user;

comparing, at the terminal, the determined context of the newly active document to the user defined relevant context information in response to determination of the context of the newly active document to detect whether the determined context is relevant to the at least one collaboration application displayed on the terminal;

determining, at the terminal, whether the determined context of the newly active document is different from the identified subject matter related context in response to detection that the determined context is relevant to the at least one collaboration application;

detecting a context change in use of the terminal by the user in response to determination that the determined context of the newly active document is different from the identified subject matter related context;

transmitting a context message from the terminal to a collaboration assistant application resident on a server in response to detection of the context change, wherein the context message is indicative of a change in the identified subject matter related context, wherein the context message includes a user identity and a detected subject matter related context indication; and adjusting the display at the terminal of the at least one collaboration option in the collaborative gateway graphical user interface in response to receipt of an update indication transmitted by the collaboration assistant application that reflects the detected subject matter related context indication.

7. The method of claim 6, further comprising:

querying, at the server, the detected subject matter related context indication against a knowledge model to determine a list of relations in response to receipt of the context message based on the detected subject matter related context indication, wherein the list of relations includes an associated user list and a document list.

8. The method of claim 7, further comprising:

transmitting an update indication from the server to the terminal in response to determination of the list of relations; and in response to the update indication, refreshing data associated with the collaboration applications at the terminal.

9. The method of claim 6, wherein identifying, at the terminal, the subject matter related context in which the terminal is being used by the user further comprises:

collecting, at the terminal, entries in an active application used by the user of the terminal;

contextual matching, at the terminal, the entries in the active application to at least one relevant context included in the relevant context information of the user context profile; and in response to the contextual match between the at least one relevant context and entries in the active application, detecting the subject matter related context of the active application based upon the contextual match.

10. The method of claim 6, wherein the terminal detecting whether the context of the newly active document is known further comprises:

the terminal detecting whether the newly active document is a new document with respect to at least one other relevant document associated with the plurality of collaboration application displayable on the collaborative gateway graphical user interface of the terminal.

11. The method of claim 6, further comprising:

in response to detection that the newly active document includes a known context, the terminal comparing the known context of the newly active document to the user context profile to detect whether the known context is relevant to the plurality of collaboration applications displayed on the collaborative gateway graphical user interface.

12. The method of claim 6, wherein the user context profile includes information indicating a plurality of context that are relevant to the plurality of collaboration applications displayed on the collaborative gateway graphical user interface.

13. A method of collaborating across a computing network comprising:

generating, at a terminal collaborative gateway graphical user interface for at least one of a plurality of collaboration applications, the at least one of the plurality of collaboration applications including at least one of a plurality of collaboration options on a display of the terminal;

background text scanning, at the terminal, a plurality of open documents displayed on the terminal to detect an unparsed, or unscanned, or new, document among all the displayed documents;

determining, at the terminal, whether the at least one unparsed, or unscanned, or new, document from among all the displayed documents is an active document;

in response to determination that the at least one unparsed document is the active document, context parsing, or scanning, the active document at the terminal to identify a document context;

detecting, at the terminal, that the document context of the active document is unknown;

retrieving a user context profile via the computer network stored in a context profile database from a server, wherein the user context profile is associated with a user account of a user of the terminal, and wherein at least a portion of the user context profile is at least partially defined by the user;

comparing, at the terminal, the detected document context of the active document to the retrieved user context profile to determine a correlation, or a match, between the detected document context of the active document and the retrieved context profile;

determining, at the terminal, whether the detected document context includes a relevant context based upon the correlation or the match of the detected document context of the active document to the retrieved context profile of the user;

in response to determination that the detected document context includes the relevant context, t identifying, at the terminal, a subject matter related context in which the terminal is being used by the user based upon the correlation between the detected document context and the relevant context;

generating, at the terminal, a context message including a user identifier and a context indication based upon the identified subject matter related context;

sending, from the terminal, the context message to a collaboration assistance application resident on the server;

receiving, at the terminal, a new context notification generated by the collaboration assistant application in response to the context message; and adjusting the display of the at least one of the collaboration options in the collaborative gateway graphical user interface based upon the new context notification.

14. The method of claim 13, wherein identifying, at the terminal, the subject matter related context in which the terminal is being used by the user further comprises:

collecting, at the terminal, entries in an active application used by the user of the terminal; and contextual matching, at the terminal, the entries in the active application to the retrieved user context profile to detect the subject matter related context of the active application.

15. The method of claim 13, wherein adjusting the display of the at least one of the collaboration applications in the collaborative gateway graphical user interface further comprises:

displaying a list of instant message contacts that are related to the identified subject matter related context.

16. The method of claim 13, wherein adjusting the display of the at least one of the collaboration applications in the collaborative gateway graphical user interface further comprises:

displaying a list of calendared events, a user email list, and a task list that are each related to the identified subject matter related context.

17. A dynamic collaboration system comprising:

a computer terminal including a collaborative gateway module and a context listener module;

the collaborative gateway module executable on the computer terminal and operable to generate a collaborative gateway graphical user interface on the computer terminal, wherein the collaborative gateway graphical user interface includes a display of at least one collaboration application, the at least one collaboration application including at least one of a plurality of collaboration options;

the context listener module executable on the computer terminal and operable on the computer terminal to substantially continuously monitor a particular subject matter context in which the computer terminal is being used by a user, wherein the context listener module is further operable to scan, or parse, an active document when the active document is recognized as new, or unscanned, or unparsed and to identify a document content of the active document, wherein the context listener module is further operable to obtain relevant contexts from a user profile stored on a server, wherein the user profile is associated with the user of the computer terminal, and wherein a portion of the user profile is at least partially defined by the user;

the context listener module is further operable to detect a contextual pattern match between the document content of the active document and at least one of the relevant contexts from the user profile;

in response to the detected contextual pattern match, the computer terminal is further operable to generate, for receipt by the server, a context message that includes a detected context indication and a user identity, wherein the detected context indication identifies the particular subject matter context in which the computer terminal is being used by the user of the computer terminal;

the computer terminal is further operable to detect receipt of a new context notification received from a collaboration assistant application on the server in response to the context message; and the collaborative gateway module is further operable to adjust the display of the at least one of the collaboration options in the collaborative gateway graphical user interface based on the new context notification.

18. The dynamic collaboration system of claim 17, wherein the context listener module includes a background text scanning component operable to scan the active document opened on the computer terminal to recognize that the active document is new, or unscanned, or unparsed, and to generate a new document indication, wherein the document recognized as new, or unscanned, or unparsed, is yet to be associated with any of the relevant contexts associated with the user of the computer terminal.

19. The dynamic collaboration system of claim 18, wherein the context listener module includes a context parser algorithm operable to compare the document content of the active document to the user profile, with the computer terminal, to detect one of the relevant contexts in response to the new document indication.

20. The dynamic collaboration system of claim 19, wherein the comparison is based at least in part on the contextual pattern match between the document content of the active document and the at least one of the relevant contexts from the user profile of the user of the computer terminal.

21. The dynamic collaboration system of claim 17, wherein the server includes a context translator module executable on the server, and the context translator module further includes a context message handling component operable to read the context message to determine the user identity and the detected context indication.

22. The dynamic collaboration system of claim 21, wherein a context lookup component included in the context translator module is operable to query the detected context indication against a knowledge model to generate a list of relations as a function of the detected context indication.

23. The dynamic collaboration system of claim 22, wherein the list of relations includes an associated user list and a document list.

24. The dynamic collaboration system of claim 23, wherein a new context notification component included in the context translator module is operable to generate the new context notification that is transmittable to the computer terminal.

25. The dynamic collaboration system of claim 22, wherein the knowledge model comprises a plurality of information items representative of links to sources of corresponding information, wherein the information items are interrelated within the knowledge model.

26. The dynamic collaboration system of claim 17, wherein the collaboration options further include a calendar component, a task management component and an email component that are each operable to display in the collaborative gateway graphical user interface respective information related to the identified particular subject matter context.

27. The dynamic collaboration system of claim 17, wherein the at least one of the collaboration options further include a buddy list operable to display a list of contacts that are related to the identified particular subject matter context.

28. The dynamic collaboration system of claim 17, further comprising a context translator module executable on the server, the context translator module operable to receive the context message and further configured to analyze the context message and generate the new context notification for receipt by the computer terminal.

29. The dynamic collaboration system of claim 28, wherein the context translator module is further operable to query the received context message against a knowledge model to determine a list of relations based on the detected context indication.

30. The dynamic collaboration system of claim 17, wherein the collaborative gateway user interface further comprises a virtual file directory component configured to display on the computer terminal a list of files or documents, or a combination thereof, that are related to the new context notification.

31. The dynamic collaboration system of claim 17, wherein the context listener module is further configured to determine that the active document is unassociated with any of the relevant contexts associated with the user of the computer terminal.

32. A method for creating a dynamic collaboration environment between users of a plurality of terminals and a server, the method comprising:

generating a collaborative gateway graphical user interface on a terminal, wherein the collaborative gateway graphical user interface includes a display of at least one collaboration application including at least one of a plurality of collaboration options;

monitoring an activity on the terminal to recognize a new, or unscanned, or unparsed, document as an active document;

scanning the active document on the terminal in response to recognition of the new or unscanned or unparsed document as the active document to identify a document content of the active document;

retrieving a user profile associated with a terminal user from the server, wherein the user profile is at least partially defined by the terminal user and contains at least one relevant context;

detecting a contextual pattern match at the terminal between the document content of the active document and the at least one relevant context of the user profile;

generating a context message at the terminal for receipt by a collaboration assistant application resident on the server in response to the detected contextual pattern match, wherein the context message includes a detected context indication and a user identity of the terminal user;

receiving a new context notification at the terminal transmitted by the collaboration assistant application in response to the context message; and adjusting the display at the terminal of the at least one of the collaboration options in the collaborative gateway graphical user interface based on the new context notification.

33. The method of claim 32 further comprising:

querying the detected context indication against a knowledge model to generate a list of relations as a function of the detected context indication.

34. The method of claim 33, wherein the knowledge model comprises a plurality of information items representative of links to sources of corresponding information, and wherein the information items are inter-related within the knowledge model.

35. The method of claim 33, wherein the list of relations includes an associated user list and a document list.

36. The method of claim 32, further comprising:

generating, at the server, generate the new context notification that is transmittable to the terminal.

37. The method of claim 32, wherein the collaboration options further include a calendar component, a task management component and an email component; and wherein adjusting the display of the at least one of the collaboration options in the collaborative gateway graphical user interface based on the new context notification further comprises:

displaying in the collaborative gateway graphical user interface information related to the detected contextual pattern match.

38. The method of claim 32, wherein the collaboration options further include a buddy list, and wherein adjusting the display of the at least one of the collaboration options in the collaborative gateway graphical user interface based on the new context notification further comprises:

displaying a list of contacts that are associated with the detected context indication.

39. The method of claim 32, wherein the collaborative gateway user interface further comprises a virtual file directory component; the method comprising:

displaying on the terminal a list of files or documents, or a combination thereof, that are related to the new context indication.

* * * * *

UNITED STATES PATENT AND TRADEMARK OFFICE
CERTIFICATE OF CORRECTION

PATENT NO. : 7,543,237 B2  Page 1 of 1
APPLICATION NO. : 10/391680
DATED : June 2, 2009
INVENTOR(S) : Nathan D. Kontny et al.

It is certified that error appears in the above-identified patent and that said Letters Patent is hereby corrected as shown below:

In the Claims

In column 12, line 41, please delete "diction."

In column 14, line 35, please delete "t."

Signed and Sealed this

Fifteenth Day of September, 2009

David J. Kappos
*Director of the United States Patent and Trademark Office*